Figure 1:
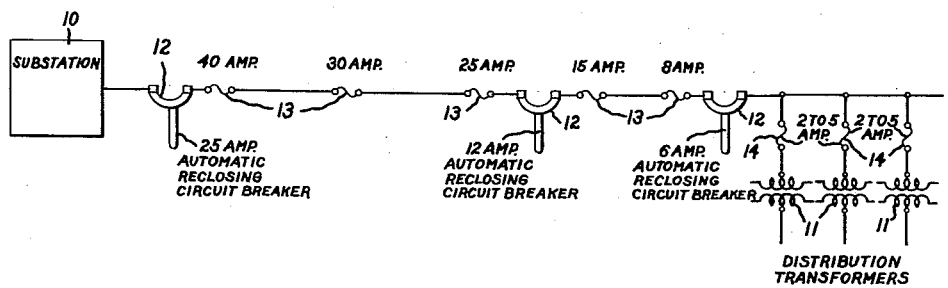

Jan. 21, 1947.    G. F. LINCKS ET AL    2,414,786
AUTOMATIC RECLOSING CIRCUIT BREAKER SYSTEM
Filed Dec. 10, 1942    2 Sheets-Sheet 1

Inventors:
George F. Lincks,
Jens M. Jensen,
by Harry E. Dunham
Their Attorney.

Jan. 21, 1947.  G. F. LINCKS ET AL  2,414,786
AUTOMATIC RECLOSING CIRCUIT BREAKER SYSTEM
Filed Dec. 10, 1942  2 Sheets-Sheet 2
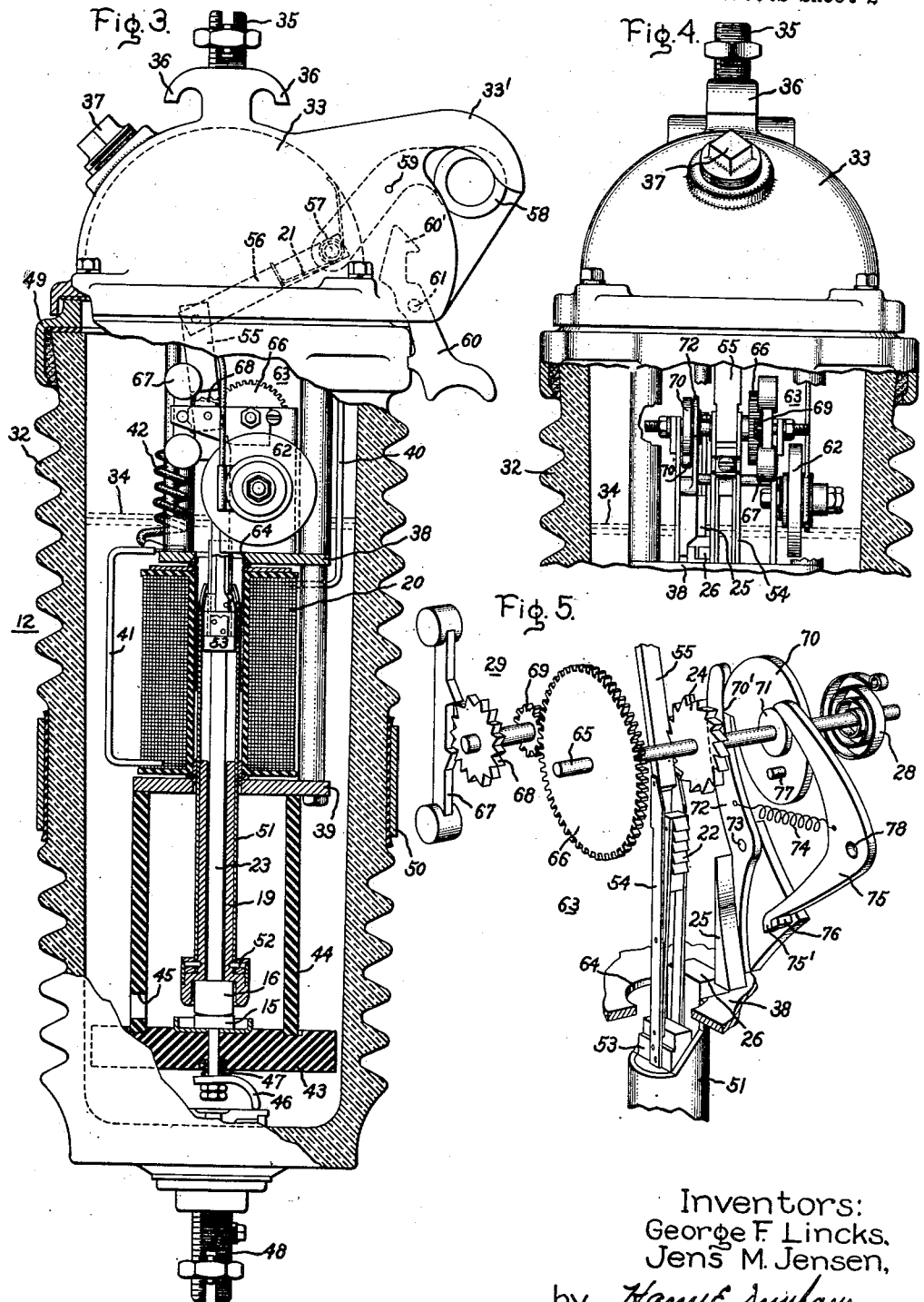
Inventors:
George F. Lincks,
Jens M. Jensen,
by Harry E. Dunlavy
Their Attorney.

Patented Jan. 21, 1947

2,414,786

UNITED STATES PATENT OFFICE 2,414,786

AUTOMATIC RECLOSING CIRCUIT BREAKER SYSTEM

George F. Lincks, Pittsfield, Mass., and Jens M. Jensen, Lansdowne, Pa., assignors to General Electric Company, a corporation of New York Application December 10, 1942, Serial No. 468,522

26 Claims. (Cl. 175—294)

Our invention relates to automatic reclosing circuit breakers and automatic reclosing circuit breaker systems, such as distribution systems employing automatic reclosing circuit breakers.

On electric power transmission and distribution systems, short circuits are divided into two classifications, namely permanent or persistent faults which cause lockout of overcurrent protective equipment requiring the attention of a trouble crew in order to restore service; and temporary faults which are not persistent so that when disconnected from the source of supply the fault is cleared and service can be restored immediately say, for example, by the automatic reclosing of the protective device. The percentage of permanent and of temporary faults will vary with uncontrollable conditions at the particular location of the circuit such as, for example, the prevalence and exposure to lightning, the prevailing wind currents, etc. Also some causes can be controlled such as by tree trimming, pulling up slack, etc., but there is an economic limit above which is it considered judicious to employ automatic reclosing equipment to first disconnect the circuit from its source of power and then to automatically reclose the circuit in order to restore service to the consumers.

It has been found advantageous to open and close the circuit more than once since the circuit must not remain disconnected for more than one to two seconds or motors may stop running and yet, in some cases, such as for example a branch falling through the lines, the fault may persist beyond this time in which the first or even the second reclosure must be completed. Naturally there is a diminishing benefit from increasing the number of reclosures as, for example, it has been found that from 50 to 90 percent successful service restoration is secured on the first reclosure, with not over 10 to 15 percent by the second and 3 to 5 percent by the third. In such cases, there is an advantage in providing for the automatic resetting of the reclosing mechanism so it will take care of any number of temporary faults and yet provide for the interrupting of a permanent fault. This is the advantage provided by equipment such as reclosing oil circuit breakers over that provided by the lower cost fuse cutouts which require manual replacement of blown fuses. Such automatic reclosing may be provided by the main overcurrent protective equipment at the substation.

However, operating experience particularly on distribution circuits operating at voltages of the order of 2500 to 15,000 volts has shown that service continuity can be improved over that provided by the substation equipment alone if overcurrent protective devices are installed out on the lines in order to confine the long outages from permanent faults to the smallest area possible. For example, a recent mathematical study showed that fusing of several branch lines with non-reclosing cutouts might reduce the minutes outage per consumer per year (consumer minutes outage) as much as 74 percent below the best that could be provided by the substation equipment alone. Generally the use of automatic reclosing equipment in branch lines will not provide much additional benefit. But, if in securing the substantial improvement in service continuity, which in the same study was shown to be obtainable by breaking the main line into a number of sections with protective devices, such branch protection were to be made impossible, the consumer minutes outage for the whole circuit very likely would be increased.

Such sectionalizing of the main line is provided by connecting in series a number of fuse cutouts preferably of the reclosing type or several relatively inexpensive automatic reclosing electric circuit interrupters of the type disclosed and claimed in Walle Patent 2,069,082, granted January 26, 1937, and assigned to the same assignee as the present application. In view of the fact that reclosing electric circuit interrupters of the Walle type employ a series coil for causing opening operation thereof, such automatic circuit reclosers can only be produced in a limited number of sizes. Consequently for protecting a distribution circuit with automatic circuit reclosers of the Walle type, it is necessary to have relatively long line sections, since only a limited number can be connected in series and still operate in a discriminating manner. Such a protective arrangement, however, has a definite advantage in that the circuit interrupting devices immediately reset upon the clearing of a temporary fault. Fuse devices such as fuse cutouts or reclosing fuse cutouts can be obtained in a much greater variety of sizes so that a distribution system can be sectionalized into a much greater number of sections, thereby permitting the isolation of a smaller section and consequently aiding in the speed with which a permanent fault can be discovered and service restored. However, there is a definite disadvantage in protecting a distribution system only by fuse devices since the rupture of the fusible element of the fuse device necessitates manual renewal, or inspection to provide this manual renewal before the last fuse link blows in the case of a reclosing fuse cutout type fuse device.

In a reclosing circuit interrupter of the Walle type, the series coil opens the circuit in much shorter time at a given current than is required to melt the fuse links in the fuse devices with which it is normally associated. These fuse devices would be located in the leads connecting transformers to the circuit and in branch lines where they are tapped off of the main circuit at points beyond the breaker. Known methods for providing time delay in these reclosing breakers with the series coil introduce inaccuracies that are almost equally disadvantageous in the securing of the desired discriminatory operation which would permit the fuse device to confine the fault to the transformer or the branch line. The inability to provide such discriminatory operation makes the fuse device inoperative and thus useless even if installed. As stated previously, such elimination of fuse devices in branch lines, and the transformers, results in greater consumer minutes outage which any improved operation secured by sectionalizing the main feeder with the reclosing breakers seldom can offset.

The quick opening of the reclosing breakers of the Walle type, has a very definite advantage in preventing the burning down of lines. Any attempt to delay the openings of the breakers in order to provide the desirable coordination with the fuse devices, decreases the ability of the breakers to clear the circuit before the lines are burned down or before they are sufficiently arc scarred so as to break at a later date.

Our invention is particularly concerned with a new and improved automatic reclosing circuit breaker which not only permits coordination between the breaker and the fuse devices of the prior art but improves the operating ability of these very inexpensive fuse devices so that in the combined arrangement the fuse devices are equivalent to that of the automatic reclosing breakers which have automatic resetting after clearing a temporary fault from the circuit. The new and improved breaker retains the quick operation which prevents the burning down of lines. The protective system thus made possible closely approaches the ideal in that it provides nearly the ultimate reduction in consumer minutes outage which is obtainable with combined substation and line protective equipments. It minimizes damage to the lines and permits securing these advantages by the provision for cooperative coordination with fuse devices which are the least expensive of all overcurrent protective equipments.

Accordingly, it is an object of our invention to provide a new and improved automatic reclosing circuit breaker.

It is another object of our invention to provide a new and improved automatic reclosing circuit breaker system which affords more desirable protection to distribution systems than was heretofore possible.

It is another object of our invention to provide a new and improved automatic reclosing circuit breaker system which employs very inexpensive overcurrent protective devices in a cooperative arrangement whereby the operative ability of the inexpensive devices is raised to equal that of the automatic reclosing circuit breaker with which they are associated.

It is another object of our invention to provide a new and improved automatic reclosing circuit breaker which retains the advantageous quick operation with other protective devices having much slower time current characteristics.

Further objects and advantages of our invention will become apparent as the following description proceeds and the features of novelty which characterize our invention will be pointed out with particularity in the claims annexed to and forming a part of this specification.

Figure 2:
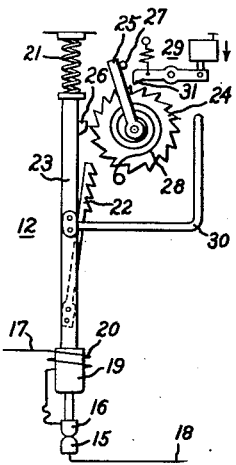

Referring now to the drawings, Fig. 1 is a schematic diagram illustrating a distribution system employing the automatic reclosing circuit breaker system of our invention; Fig. 2 is a schematic diagram of an automatic reclosing circuit breaker embodying our invention; Fig. 3 is a view partly in section of a commercial embodiment of the automatic reclosing circuit breaker schematically illustrated in Fig. 2; Fig. 4 is a side view partly in section of the upper portion of Fig. 3; Fig. 5 is a perspective view of a portion of the automatic reclosing circuit breaker of Figs. 3 and 4, and Figs. 6 and 7 are schematic diagrams, similar to Fig. 2 of modifications of the automatic reclosing circuit breaker of our invention.

Referring now to Fig. 1, we have schematically illustrated in a one line diagram a distribution system comprising a substation 10 supplying a plurality of distribution transformers 11 which supply any load circuits such as ordinary house lighting circuits or the like. In Fig. 1, only the distribution transformers at the end of the line have been illustrated. The substation 10 and distribution transformers 11 are interconnected by a power line which is sectionalized by automatic reclosing circuit breakers 12, and a plurality of fuse devices or fuse cutouts 13. Both the circuit breakers and cutouts have varied ratings which progressively decrease from the substation to the distribution end of the circuit. In addition, a plurality of transformer fuses 14 are provided connecting each distribution transformer with the line. In prior art arrangements where the entire protection for such a distribution circuit was afforded by fuse cutouts, temporary faults would cause isolation of the portion of the system beyond the fuse cutouts with the necessity of manual replacement of the fuse link in the fuse device before service could be restored. Fuse devices, however, did have the advantage in permitting sectionalizing the system into small sections by connecting a number of them in series so arranged as to provide discriminating operation. With the advent of the automatic reclosing circuit breaker of the Walle type, which was relatively inexpensive, to reclosing breakers employed at the substation and consequently to distribution circuits of the type disclosed, temporary faults on such a system could be cleared quickly, but because of the relatively few sizes which are available, long line sections were required with the consequent greater difficulty in locating a permanent fault than with the fuse device. Fig. 1 shows a properly coordinated system embodying the features of our invention in which both the automatic reclosing breakers and fuse devices are used to permit the sectionalizing of smaller sections of the line with fuses plus the automatic reclosing operation of the breaker.

Referring now to Fig. 2 we have illustrated an automatic reclosing circuit breaker generally indicated at 12 which is the same reference numeral used in Fig. 1 to designate the reclosing circuit breakers illustrated therein. This automatic reclosing circuit breaker comprises a pair of relatively movable contacts illustrated as a stationary contact 15 and a movable contact 16 which are respectively connected to sections 17 and 18 of the distribution circuit with which automatic reclosing circuit breaker 12 is associated. Opening of automatic reclosing circuit breaker 12 is obtained by virtue of a solenoid having an armature 19 and a winding 20. Winding 20 is connected in series with line section 17 so that whenever the line current increases to a certain value, due to a fault for example, relative separation of contacts 15 and 16 occurs. Contact 16 is normally biased to the closed position by means of a spring 21 as well as by the action of gravity. Whenever a fault occurs on the circuit the energization of winding 20 to a sufficient extent by virtue of the fault current will cause relative separation of contacts 15 and 16 to interrupt the circuit. However, this also causes immediate deenergization of winding 20 and gravity and spring 21 cause immediate reclosing of contacts 15 and 16. If the fault is temporary in nature, circuit breaker 12 will remain closed. As in the Walle patent referred to above, it may be desirable to have the circuit breaker open and close a predetermined number of times to determine whether or not the fault is temporary or permanent. If the circuit breaker continues to open and close it is evident that a permanent fault exists and it is desirable to isolate that section of the system including the permanent fault. Our invention is specifically concerned with an automatic reclosing circuit breaker and an automatic reclosing circuit breaker system in which the automatic reclosing circuit breaker 12 locks closed upon determining that a permanent fault exists, to permit the fuses such as 13 coordinated therewith, to operate and isolate the faulty section after which circuit breaker 12 is again rendered operative in the original manner.

With the arrangement described thus far, circuit breaker 12 will continue to open and close indefinitely in the event of a permanent fault. In accordance with our invention, we provide a ratchet member 22 mounted on contact rod 23 associated with movable contact 16. Ratchet member 22 is biased by suitable means to engage upon downward movement of contact rod 23 a coacting ratchet wheel 24 which controls the operation of an interference member 25 for engaging a projection 26 suitably mounted on operating or contact rod 23. Every time that circuit breaker 12 opens and recloses, ratchet 22 engages coacting ratchet wheel 24 and rotates it in a counterclockwise direction as viewed in Fig. 2. After a predetermined number of openings and reclosures such as 3, for example, interference member 25 will have rotated to engage cooperating member or projection 26 so that subsequent energization of winding 20 which would ordinarily cause opening of reclosing circuit breaker 12 will be ineffective to cause such opening. In order that interference member 25 will assume the position indicated in Fig. 2 against stop 27 after each clearing of a temporary fault or upon the clearing of any fault, we provide a spring 28 which biases ratchet wheel 24 in a clockwise direction. However, in order to prevent spring 28 from returning ratchet wheel 24 to the position shown in Fig. 2 after each opening and closing of circuit breaker 12, we provide a time delay device schematically illustrated at 29, which is actuated by a member 30 upon each opening operation of circuit breaker 12. Member 30 is suitably fastened to contact or operating rod 23.

Time delay device 29 is provided with a member 31 for engaging the notches of ratchet wheel 24 so as to permit counterclockwise rotation thereof, but to prevent clockwise rotation thereof immediately after member 30 has actuated time delay device 29. In the event of a permanent fault causing a number of successive openings and reclosings of circuit breaker 12, a ratchet wheel 24 will be successively rotated in a counterclockwise direction and time delay device 29 will prevent spring 28 from returning ratchet wheel 24 to the position indicated in Fig. 2. However, if the interval of time between openings of circuit breaker 12 is greater than three seconds for example, time delay device 29 will have operated to release ratchet wheel 24 and consequently permit resetting to the position indicated in Fig. 2. It will be observed that with the arrangement described thus far an automatic reclosing circuit breaker is provided which operates at high speed to clear temporary faults and which upon recognition of a permanent fault, remains closed for a sufficiently long period of time to permit fuse devices coordinated therewith to operate and isolate the section including the permanent fault, after which the automatic reclosing circuit breaker is again permitted to operate in the normal manner to be capable of distinguishing between temporary and permanent faults.

In Figs. 3, 4, and 5 there is illustrated a commercial embodiment of the automatic reclosing circuit breaker schematically illustrated in Fig. 2. This circuit breaker is illustrated as comprising a cylindrical casing 32 formed of insulating material and closed at the upper end thereof by means of a terminal cap 33. Normally the casing is vertically positioned with the lower portion thereof filled to the level indicated at 34 with a suitable arc-extinguishing liquid such as oil in which the circuit interrupting means comprising relatively movable contacts 15 and 16 operate. The corresponding parts of Figs. 3, 4 and 5 are designated by the same reference numerals as in Fig. 2.

Terminal cap 33 is provided with a terminal stud 35 adapted to be connected to line section 17 or 18 of Fig. 2. Terminal cap 33 is also provided with suitable lifting lugs 36 and an oil filling plug 37. Mechanically supported from terminal cap 33 is an upper coil plate 38 which in turn mechanically supports a lower coil plate 39. Between upper coil plate 38 and lower coil plate 39 is mounted the winding 20 of the solenoid which also comprises armature 19. One end of winding 20 is electrically connected as by conductor 40 to terminal cap 33, while the other end of winding 20 is connected by conductor 41 and flexible lead 42 to the operating rod 23 for moving contact 16.

Stationary contact 15 is supported on an insulating plate 43 which in turn is supported from lower coil plate 39. A suitable insulating sleeve 44 encloses the contacts 15 and 16 although an opening 45 is provided for the escape of oil and high pressure gases produced during a circuit interrupting operation. Stationary contact 15 is electrically connected to a contact 46 mounted below insulating plate 43 which is biased downwardly as by means of spring 47. Contact 46 is adapted to electrically engage a portion of lower terminal stud 48 which extends into casing 32.

The construction described thus far is arranged so that when cap 33 is lifted away from casing 32 the entire reclosing circuit breaker unit is removed from casing 32, the circuit being broken at contact 46. This enables ready inspection and repair whenever this is necessary. Upper terminal cap 33 is bolted to a flange 49 suitably sealed to casing 32. Casing 32 in turn may be supported from a suitable pole or insulator, by means of a support 50 surrounding casing 31, only a small portion thereof being shown in the drawings.

Surrounding armature 19 and enclosing movable contact operating rod 23 is a guide tube 51 which is pinned to armature 19 as indicated at 52. Armature 19 and guide tube 51 are movable relative to operating rod 23, and armature 19 is adapted to engage an enlargement 53 on operating rod 23 to cause high speed relative separation of contacts 15 and 16. The upper end of operating rod 23 is connected by means of links 54 and 55 to a bell crank 56 pivotally mounted at 57. One end of bell crank 56 extends through an opening in cap 33 and is provided with an operating lever or eye 58 so that relative separation of contacts 15 and 16 may be manually produced as by means of an ordinary switch-hook or the like. Operating lever, or eye 58 also serves as an indicator to indicate the operating position of the contacts 15 and 16. Cap 33 is provided with a hook-like extension 33' which protects operating lever 58 from the weather. A suitable pin 59 on the portion of bell crank 56 extending through an opening in cap 33 is adapted to engage the hook-shaped portion 60' of a lockout lever 60, which is pivotally mounted at 61. With this arrangement the circuit breaker may be held in the open position indefinitely if desired. The lockout lever 60 will be moved about pivot 61 when it is desired to permit normal operation of automatic reclosing circuit breaker 12.

Spring means 21 which was schematically shown in Fig. 2 is associated with bell crank 56 as clearly shown in Fig. 3 to tend to move contact 16 into engagement with stationary contact 15. In order to protect winding 20 of the solenoid against high voltage surges which occur on the circuit, we provide a suitable surge arrestor generally indicated at 62 which is connected across the terminals of winding 20. When the electrical circuit is connected to upper and lower terminal studs 35 and 48 respectively a fault current of sufficient magnitude will cause armature 19 to move upwardly so as to strike enlargement 53 and cause high speed relative separation of contacts 15 and 16 with the consequent interruption of the circuit between terminals 35 and 48. Such interruption of the circuit, of course, deenergizes the winding 20 of the solenoid so that spring 21 and gravity cause contact 16 to move back to the closed position.

In order to control the opening and closing of automatic reclosing circuit breaker 12 so as to enable it to distinguish between a temporary and a permanent fault, we provide a reclosing mechanism best shown in Fig. 5 and generally indicated as 63. This reclosing mechanism includes the ratchet wheel 24 and interference member 25 already described in connection with the schematic disclosure of Fig. 2. This reclosing mechanism is supported on upper coil plate 38 which has an opening 64 therein to permit movement of circuit breaker operating rod 23 and guide tube 51. The ratchet 22 is mounted within link 54 and is spring biased into engagement with ratchet wheel 24 upon the downward stroke of operating rod 23. Ratchet wheel 24 is mounted on a suitable shaft 65 which is biased to rotate in a clockwise direction as viewed in Fig. 5 by virtue of spring means 28 acting on shaft 65. Also mounted on shaft 65 is a driving gear 66 of time delay mechanism 29 which is indicated as of the escapement type. The escapement device comprises oscillating member 67 and cooperating escapement wheel 68 which is rotated by gear 69 meshed with driving gear 66. Whenever ratchet 22 having moved upwardly starts downward movement by virtue of gravity and spring 21 and rotates ratchet wheel 24, time delay mechanism 29 is operated. Subsequently after downward movement of ratchet 22 has caused disengagement from ratchet wheel 24 as shown in Fig. 5, spring 28 returns ratchet wheel 24 to the normal position with a predetermined time delay as governed by time delay mechanism 29 comprising escapement mechanism 67-68.

Also mounted on shaft 65 is a double cam 70-71. The cam 70 is normally in the position indicated in Fig. 5 with the high point 70' thereof engaging the upper end of a pivotally mounted lever 72 to which is fastened interference member 25. Lever 72 is pivotally mounted at 73 and is normally biased in a clockwise direction as viewed in Fig. 5 by spring means 74. However, in the position indicated in Fig. 5 the high point 70' of cam 70 moves the upper end of lever 72 so as to move interference member 25 away from cooperating member 26 to permit free upward movement of tube 51 to which member 26 is fastened. Lever 72 is also furthermore held in the position indicated in Fig. 5 by trip lever 75 which is provided with a hook-shaped end 75' for engaging a pin 76 on lever 72. The other end of trip lever 75 rides on cam 71. As long as the hook-shaped end 75' of trip lever 75 engages pin 76 spring 74 is prevented from moving interference member 25 to engage member 26. However, cam 70 is provided with a pin 77 which upon sufficient rotation of cam 70 such as by two or three or more successive openings and closings of circuit breaker 12, will be rotated to engage the end of trip lever 75 which engages cam 71 which in turn is rotated about pivot 78 to cause release of the hook-shaped end 75' from pin 76. By this time the high point 70' of cam 70 has moved free of the end of lever 72 so that spring 74 causes interference member 25 to engage with cooperating member 26 to prevent upward movement of guide tube 51 and consequently to prevent relative separation of contacts 15 and 16. In other words with the arrangement described, the contacts 15 and 16 of the circuit breaker, in the event of a permanent fault are locked in the closed position for a time which depends upon the fault condition. As long as the fault current is sufficient to cause armature 19 to be attracted, the upward force exerted by member 26 against interference member 25 causes lever 72 to bear against cam 70 with sufficient force to prevent spring 28 from rotating shaft 65 in a clockwise direction. When, however, the fault is removed so that the current through winding 20 is not sufficient to keep armature 19 attracted, spring 28 is free to return ratchet wheel 24 and cam 70 to their original positions in which they are shown in Fig. 5 by clockwise rotation thereof, as viewed in Fig. 5 and as heretofore described. Cam 70 in moving to the position indicated in Fig. 5 causes interference member 25 to move in a counterclockwise direction as viewed in Fig. 5 to free cooperating member 26 whereupon the automatic reclosing circuit interrupter is again free to operate in the manner described heretofore in response to temporary and permanent faults. When the automatic reclosing circuit breaker 12 is used in a direct current circuit, the force exerted by cooperating member 26 against interference member 25 is a steady one as long as a fault current continues to flow through the circuit breaker contacts after they have been locked closed. However, when the automatic reclosing circuit breaker 12 is used in an alterating current circuit, the force exerted by cooperating member 26 against interference member 25 varies with the instantaneous value of the fault current so that, during the zero current portion of each cycle of fault current, armature 19 and tube 51 tend to drop down and during each such brief interval to move member 26 away from interference member 25, thereby allowing spring 28 gradually to rotate cam 70 and, in time, effect the movement of interference member 25 out of blocking engagement with cooperating member 26. In order to prevent such a movement of interference member 25 while the fault current is flowing through winding 20, members 25 and 26 may be arranged in any suitable manner so that these slight downward movements of cooperating member 26 which may occur during the zero current portion of each cycle of the fault current are not sufficient to allow interference member 25 to be rotated about pivot 73 by cam 70 and spring 28.

In view of the detailed description included above, it is believed that the operation of our automatic reclosing circuit breaker will be obvious to those skilled in the art and no further discussion thereof will be made.

Figure 6:
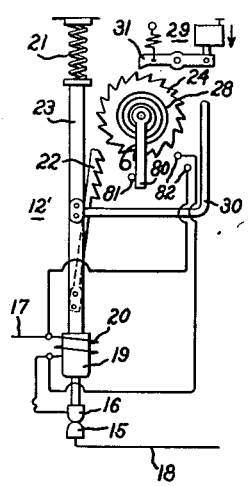

Instead of providing an interference member to hold the contacts in a closed position for a sufficient time to permit the fuse devices to operate, it may be desira to provide means for short-circuiting all, or a portion of the series winding 20 and accordingly in Fig. 6 we have illustrated schematically a modification of our invention. The corresponding parts of Fig. 6 are designated by the same reference numerals as in Fig. 2. Rigidly fastened to ratchet wheel 24 is a contact-controlling member 80, which is normally biased against stop 81 as by means of spring 28. During the reclosing operation following a predetermined number of openings of circuit breaker 12', contact controlling member 80 will engage contacts 82 to close a circuit paralleling the winding 20 of the solenoid which causes relative separation of contacts 15 and 16. Short circuiting or paralleling of this winding will, of course, render the solenoid ineffective to open the circuit for a predetermined time determined by time delay mechanism 29. It should be understood by those skilled in the art that contact controlling member 80 may be arranged to short circuit only a portion of the winding 20 of the contact operating solenoid so as to raise the minimum pickup current and consequently lengthen the time current characteristic of the automatic reclosing circuit breaker. This would permit discriminative operation with fuse devices so that with the full winding of the breaker opens ahead of the fuses and after the portion of the winding was short circuited, the fuse devices coordinated therewith would operate so as to confine the faults to smaller sections of the circuit having permanent faults thereon.

Figure 7:
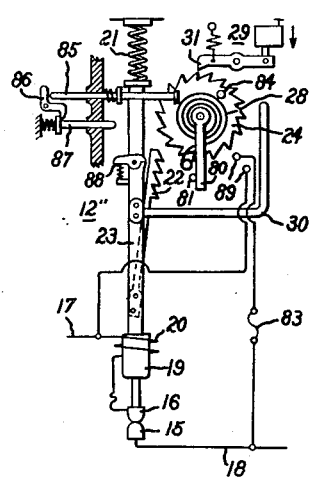

Instead of by-passing or short-circuiting winding 20, contact controlling arm 80 may be arranged to complete an external circuit around circuit breaker 12'' through a suitable fuse 83 as is shown in Fig. 7 wherein the corresponding parts thereof are designated by the same reference numerals as in Fig. 6. In this case, the automatic reclosing circuit breaker 12'' may be of the type disclosed in the above mentioned Walle patent which locks open after a predetermined number of openings and reclosures. As indicated in Fig. 7, this is accomplished by the engagement of a pin 84 on ratchet wheel 24 with a plunger 85 which in turn operates a latch 86 to release spring biased plunger 87 which engages with a projection 88 on operating rod 23 so as to hold the automatic reclosing circuit breaker in the open position upon the occurrence of a permanent fault. Simultaneously with the locking of contact 16 in the open position, contact controlling member 80 bridges contacts 89 to reestablish the circuit externally of circuit breaker 12' through a suitable fuse device 83 having slow or time-current characteristics through the breaker and so coordinated as to permit the fuse associated with the faulted section to operate to isolate the faulted section. It will be obvious that Fig. 7 requires resetting of the automatic reclosing circuit breaker upon operation thereof as contrasted with the arrangements disclosed in Figs. 2 and 6 wherein automatic resetting occurs.

It should be understood that our invention is not limited to the specific details of construction and arrangement thereof herein illustrated and that changes and modifications may occur to one skilled in the art without departing from the spirit of our invention.

What we claim as new and desire to obtain by Letters Patent of the United States is:

1. For use in a sectionalized distribution circuit having a current responsive circuit interrupting device serially arranged in said circuit for sectionalizing said system, a reclosing circuit breaker comprising means for effecting opening of said circuit breaker upon the occurrence of a fault on said circuit prior to operation of said device, reclosing means for automatically reclosing said circuit breaker when said circuit breaker is open, and means for effectively blocking the opening movement of said circuit breaker after a predetermined number of operations in close succession indicating the presence of a permanent fault, so as to provide sufficient time for said device to isolate the section upon which said permanent fault exists so that maximum continuity of service may be maintained.

2. For use in a sectionalized distribution circuit having a plurality of current responsive circuit interrupting devices of varied sizes and interrupting times serially arranged in said circuit for sectionalizing said system, a reclosing circuit breaker comprising electromagnetic means including a winding in series with said circuit for effecting opening of said circuit breaker upon the occurrence of a fault on said circuit prior to operation of said devices, reclosing means for automatically reclosing said circuit breaker when said circuit breaker is open, and means for effectively blocking the opening movement of said circuit breaker after a predetermined number of operations in close succession indicating the presence of a permanent fault, so as to provide sufficient time for at least one of said devices to isolate the section upon which said permanent fault exists so that maximum continuity of service may be maintained.

3. For use in a sectionalized distribution circuit having a plurality of current responsive circuit interrupting devices of varied sizes and interrupting times serially arranged in said circuit for sectionalizing said system, a reclosing circuit breaker comprising electromagnetic means including a winding in series with said circuit for effecting opening of said circuit breaker upon the occurrence of a fault on said circuit prior to operation of said devices, reclosing means for automatically reclosing said circuit breaker when said circuit breaker is open, and means including an interference member blocking the opening movement of said circuit breaker after a predetermined number of operations in close succession indicating the presence of a permanent fault, so as to permit one or more of said devices to isolate the section upon which said permanent fault exists so that maximum continuity of service may be maintained.

4. For use in a sectionalized distribution circuit having a current responsive circuit interrupting device serially arranged in said circuit for sectionalizing said system, a reclosing circuit breaker comprising means for effecting opening of said circuit breaker upon the occurrence of a fault on said circuit prior to operation of said device, reclosing means for automatically reclosing said circuit breaker when said circuit breaker is open, and means for locking said circuit breaker in a predetermined position after a predetermined number of operations in close succession indicating the presence of a permanent fault and for simultaneously completing a circuit to permit said device to isolate the section upon which said permanent fault exists so that maximum continuity of service may be maintained.

5. For use in a sectionalized distribution circuit having a plurality of current responsive circuit interrupting devices of varied sizes and interrupting times serially arranged in said circuit for sectionalizing said system, a reclosing circuit breaker comprising electromagnetic means including a winding connected in series with said circuit so as to be energized normally by the current flowing through said circuit for effecting opening of said circuit breaker upon the occurrence of a fault on said circuit prior to operation of said devices, reclosing means for automatically reclosing said circuit breaker when said circuit breaker is open, and means effective upon operation of said circuit breaker causing paralleling said winding for effectively preventing the opening movement of said circuit breaker after a predetermined number of operations in close succession indicating the presence of a permanent fault, so as to permit one or more of said devices isolates the section upon which said permanent fault exists so that maximum continuity of service may be maintained.

6. For use in a sectionalized distribution circuit having a plurality of current responsive circuit interrupting devices of varied sizes serially arranged in said circuit for sectionalizing said system, a reclosing circuit breaker comprising means including a solenoid energized with the circuit current for opening said circuit breaker upon the occurrence of a fault on said circuit prior to operation of said devices, reclosing means for automatically reclosing said circuit breaker when said circuit breaker is open, and means including an interference member engaging a cooperating portion of said circuit breaker locking said circuit breaker in a closed position after a predetermined number of operations thereof in close succession indicating the presence of a permanent fault so as to provide sufficient time for at least one of said devices to operate to isolate the section upon which said permanent fault exists so that maximum continuity of service may be maintained.

7. An electric circuit interrupting device of the reclosing type comprising two contacts normally in engagement, an electromagnet having a winding normally connected so as to be energized by the current through said contacts when they are in engagement and having an armature arranged to move one of said contacts instantly out of engagement with the other of said contacts when the current through said winding exceeds a predetermined value, means for moving said one of said contacts into engagement with said other contact when said winding is deenergized, and means actuated in response to the reclosing movement of said one of said contacts following a predetermined opening movement thereof for completing a short circuit around said electromagnet to render it inoperative to move said one of said contacts out of engagement with said other contact after said contacts are moved into engagement by said reclosing movement.

8. An electric circuit interrupting device of the reclosing type comprising two contacts normally in engagement, an electromagnet comprising a winding connected in series with said contacts and arranged to move one of said contacts out of engagement with the other when the current through said series connected winding and contacts exceeds a predetermined value, means for moving said contacts into engagement when said winding is deenergized, and means for maintaining said contacts in engagement as long as the current through said contacts exceeds a predetermined value following a predetermined number of reclosures of said contacts.

9. An electric circuit interrupting device of the reclosing type comprising two contacts normally in engagement, an electromagnet comprising a winding connected in series with said contacts and arranged to move one of said contacts out of engagement with the other when the current through said series connected winding and contacts exceeds a predetermined value, means for moving said contacts into engagement when said winding is deenergized, and means for mechanically locking said one of said contacts in engagement with the other of said contacts as long as the current through said contacts is in excess of a predetermined value following a predetermined number of reclosures of said contacts.

10. An electric circuit interrupting device of the reclosing type comprising two contacts normally in engagement, an electromagnet comprising a winding connected in series with said contacts and arranged to move one of said contacts out of engagement with the other when the current through said series connected winding and contacts exceeds a predetermined value, means for moving said contacts into engagement when said winding is deenergized, and means controlled by the current through said contacts for maintaining said contacts in engagement as long as said last mentioned current is above a predetermined value following a predetermined number of reclosures of said contacts.

11. An electric circuit interrupting device of the reclosing type comprising two contacts normally in engagement, an electromagnet comprising a winding connected in series with said contacts and arranged to move one of said contacts out of engagement with the other when the current through said series connected winding and contacts exceeds a predetermined value, means for moving said contacts into engagement when said winding is deenergized, and means for mechanically locking said one of said contacts in engagement with the other of said contacts as long as the current through said contacts is in excess of a predetermined value following a predetermined number of reclosures of said contacts and for a predetermined time interval when the current through said contacts is below said last mentioned predetermined value following said predetermined number of openings and reclosures of said contacts.

12. An electric circuit interrupting device of the reclosing type comprising two contacts normally in engagement, an electromagnet comprising a winding connected in series with said contacts and arranged to move one of said contacts quickly out of engagement with the other of said contacts in response to the current through said series connected winding and contacts exceeding a predetermined value, means for moving said one of said contacts into engagement with said other contact when said winding is deenergized, timing means actuated by said one of said contacts during the closing operation thereof for retarding said closing operation, and means controlled by said timing means in response to a predetermined number of actuations thereof for mechanically locking said contacts in engagement as long as the current through said series connected winding and contacts is above a predetermined value.

13. An electric circuit interrupter of the reclosing type comprising circuit interrupting means including a movable contact, means for reclosing said interrupting means after a circuit opening operation, a member associated with said movable contact and movable therewith, an interference member adapted to engage said first mentioned member to hold said circuit interrupting means in the closed position, a latch normally holding said interference member out of engagement with said first mentioned member, means including a ratchet and gear train operatively connected to said interrupting means and arranged after a predetermined number of operations of said interrupting means to trip said latch and cause said interference member to engage said first mentioned member, means for maintaining said interference member in engagement with said first mentioned member as long as the current through said contacts is above a predetermined value, and means for causing resetting of said latch and interference member so said circuit interrupting means is again operative to open and reclose.

14. An electric circuit interrupter of the reclosing type comprising circuit interrupting means including a movable contact, means for reclosing said interrupting means after a circuit opening operation, a member associated with said movable contact and movable therewith, an interference member adapted to engage said first mentioned member to hold said circuit interrupting means in the closed position, a latch normally holding said interference member out of engagement with said first mentioned member, means including a ratchet and gear train operatively connected to said interrupting means and arranged after a predetermined number of operations of said interrupting means to trip said latch and cause said interference member to engage said first mentioned member, means for maintaining said interference member in engagement with said first mentioned member as long as the current through said contacts is above a predetermined value, and spring means for causing setting of said latch and interference member so said circuit interrupting means is again operative to open and reclose.

15. An electric circuit interrupter of the reclosing type comprising circuit interrupting means including a movable contact, means for reclosing said interrupting means after a circuit opening operation, a member associated with said movable contact and movable therewith, an interference member adapted to engage said first mentioned member to hold said circuit interrupting means in the closed position, a latch normally holding said interference member out of engagement with said first mentioned member, means including a ratchet and gear train operatively connected to said interrupting means and arranged after a predetermined number of operations of said interrupting means to trip said latch and cause said interference member to engage said first mentioned member, means for maintaining said interference member in engagement with said first mentioned member as long as the current through said contacts is above a predetermined value, spring means for causing resetting of said latch and interference member, and an escapement mechanism for controlling the operation of said spring means so that said circuit interrupting means is again operative to open and reclose.

16. An electric circuit interrupting device of the reclosing type comprising two contacts normally in engagement, an electromagnet having a winding normally connected in series with said contacts and having an armature arranged to move one of said contacts out of engagement with the other of said contacts in response to the current through said series connected winding and contacts exceeding a predetermined value, means for moving said one of said contacts into engagement with said other contact when said winding is deenergized, and means controlled by the movement of said armature for rendering said electromagnet inoperative to move said one of said contacts out of engagement with said other contact as long as said current exceeds a predetermined value subsequent to a predetermined reclosure of said contacts.

17. An electric circuit interrupting device of the reclosing type comprising two contacts normally in engagement, an electromagnet having a winding normally connected in series with said contacts and having an armature arranged to move one of said contacts out of engagement with the other of said contacts in response to the current through said winding exceeding a predetermined value, means for moving said one of said contacts into engagement with said other contact when said winding is deenergized, and means controlled by the movement of said armature for locking said contacts in engagement as long as said current exceeds a predetermined value after said contacts have been reclosed a predetermined number of times.

18. An electric circuit interrupting device of the reclosing type comprising two contacts normally in engagement, an electromagnet having a winding normally connected in series with said contacts and having an armature which exerts on one of said contacts a force to move said one of said contacts out of engagement with the other of said contacts in response to the current through said winding exceeding a predetermined value, means for moving said one of said contacts into engagement with said other contact when said winding is deenergized, and means controlled by the movement of said armature for mechanically locking said contacts in engagement against the opening force exerted on said one of said contacts by said armature as long as said opening force exists after said contacts have been reclosed a predetermined number of times.

19. An electric circuit interrupting device of the reclosing type comprising contacts normally in engagement, an electromagnet having a winding normally connected in series with said contacts and having an armature which exerts force to move said contacts out of engagement in response to current through said winding exceeding a predetermined value, means for moving said contacts into engagement when said winding is deenergized, and means controlled by the movement of said armature and said contacts for mechanically locking said contacts in engagement against the opening force exerted by said armature as long as said opening force exists after said contacts have been opened and reclosed a predetermined number of times.

20. An electric circuit interrupting device of the reclosing type comprising two normally closed contacts, an electromagnet having a winding connected in series with said contacts and having an armature for exerting on one of said contacts a force to move said one of said contacts out of engagement with the other contact when the current through said winding exceeds a predetermined value, means for moving said one of said contacts into engagement with said other contact when said winding is deenergized, a mechanical lock for preventing said one of said contacts from being moved out of engagement with said other contact by said armature as long as said opening force exists, holding means for normally rendering said mechanical lock inoperative, and means responsive to a predetermined number of opening and reclosing movements of said one of said contacts for releasing said holding means to render said lock operative.

21. An electric circuit interrupting device of the reclosing type comprising two contacts normally in engagement, an electromagnet comprising a winding connected in series with said contacts and arranged to move one of said contacts out of engagement with the other of said contacts in response to the current through said series connected winding and contacts exceeding a predetermined value, means for moving said one of said contacts into engagement with said other contact when said winding is deenergized, timing means controlled by the movement of said armature for retarding the movement of said one of said contacts, and means controlled by said timing means in response to a predetermined number of actuations thereof for rendering said electromagnet inoperative to move said one of said contacts out of engagement with said other contact as long as the current through said contacts exceeds a predetermined value.

22. An electric circuit interrupting device of the reclosing type comprising two contacts normally in engagement, an electromagnet comprising a winding connected in series with said contacts and arranged to move one of said contacts quickly out of engagement with the other of said contacts in response to the current through said series connected winding and contacts exceeding a predetermined value, means for moving said one of said contacts into engagement with said other contact when said winding is deenergized, timing means actuated by said one of said contacts during the closing operation thereof for retarding said closing operation, and means controlled by said timing means in response to a predetermined number of actuations thereof for rendering said electromagnet inoperative to move said one of said contacts quickly out of engagement with said other contact as long as the current through said contacts exceeds a predetermined value.

23. An electric circuit interrupting device of the reclosing type comprising line and load terminals, contacts associated with each of said terminals, said contacts normally in engagement, an electromagnet comprising a winding connected in series with said contacts and an armature arranged to move said contacts out of engagement in response to the current through said series connected winding exceeding a predetermined value, means for moving said contacts into engagement when said winding is deenergized, timing means actuated by movement of said armature and said contacts, said timing means being automatically returnable to its normal at rest position when said current does not exceed said predetermined value, and means controlled by said timing means in response to a predetermined operation of said timing means from said normal at rest position for rendering said electromagnet inoperative to move said contacts out of engagement as long as the current through said contacts exceeds a predetermined value.

24. An electric circuit interrupting device of the reclosing type comprising two contacts normally in engagement, an electromagnet comprising a winding connected in series with said contacts and arranged to move one of said contacts quickly out of engagement with the other of said contacts in response to the current through said series connected winding and contacts exceeding a predetermined value, means for moving said one of said contacts into engagement with said other contact when said winding is deenergized, timing means actuated by said one of said contacts for retarding said closing operation, and means controlled by said timing means in response to a predetermined number of actuations thereof for mechanically locking said contacts in engagement as long as said current is above a predetermined value.

25. An electric circuit interrupting device of the reclosing type comprising two contacts normally in engagement, an electromagnet comprising a winding connected in series with said contacts and arranged to move one of said contacts quickly out of engagement with the other of said contacts in response to the current through said series connected winding and contacts exceeding a predetermined value, means for moving said one of said contacts into engagement with said other contact when said winding is deenergized, timing means actuated by said one of said contacts during the closing operation thereof for retarding said closing operation, and means controlled by said timing means in response to a predetermined number of actuations thereof for mechanically locking said contacts in engagement as long as said current is above a predetermined value and for maintaining said contacts mechanically locked in engagement for a predetermined time interval when the current through said series connected winding and contacts is below a predetermined value while said contacts are mechanically locked in engagement.

26. An electric circuit interrupting device of the reclosing type comprising two contacts normally in engagement, an electromagnet comprising a winding connected in series with said contacts and arranged to provide a force to move one of said contacts out of engagement with the other when the current through said series connected winding and said contacts exceeds a predetermined value, means for moving said contacts into engagement when said winding is deenergized, means for maintaining a parallel circuit around said electromagnet so as to render said electromagnet inoperative to move said one of said contacts out of engagement with said other after said contacts are moved into engagement, and timing means actuated from said force and operative after a predetermined opening and reclosing of said contacts for directly controlling the time interval said parallel circuit maintaining means maintains the parallel circuit around said electromagnet.

GEORGE F. LINCKS.
JENS M. JENSEN.

Certificate of Correction

Patent No. 2,414,786. January 21, 1947.

GEORGE F. LINCKS ET AL.

It is hereby certified that errors appear in the printed specification of the above numbered patent requiring correction as follows: Column 9, line 5, for "alteranting" read *alternating*; column 11, line 55, after "sizes" insert *and interrupting times*; and that the said Letters Patent should be read with these corrections therein that the same may conform to the record of the case in the Patent Office.

Signed and sealed this 6th day of May, A. D. 1947.

[SEAL]

LESLIE FRAZER,
*First Assistant Commissioner of Patents.*